US008045530B2

(12) United States Patent
Haverinen et al.

(10) Patent No.: US 8,045,530 B2
(45) Date of Patent: Oct. 25, 2011

(54) METHOD AND APPARATUS FOR AUTHENTICATION IN A WIRELESS TELECOMMUNICATIONS SYSTEM

(75) Inventors: Henry Haverinen, Tampere (FI); Anton Bush, Nottingham (GB); Jyri Rinnemaa, Tampere (FI); Mike P. Smith, Campridge (GB); Timo Takamäki, Tampere (FI); Jukka Tuomi, Tampere (FI); Hannu Tuominen, Kauniainen (FI)

(73) Assignee: Nokia Corporation, Espoo (FI)

( * ) Notice: Subject to any disclaimer, the term of this patent is extended or adjusted under 35 U.S.C. 154(b) by 1094 days.

(21) Appl. No.: 10/347,947

(22) Filed: Jan. 21, 2003
(Under 37 CFR 1.47)

(65) Prior Publication Data
US 2004/0208151 A1 Oct. 21, 2004

(30) Foreign Application Priority Data
Jan. 18, 2002 (EP) .................................... 02250352

(51) Int. Cl.
*H04W 4/00* (2009.01)
*H04L 12/28* (2006.01)
*H04L 9/32* (2006.01)
*H04J 3/16* (2006.01)
*G06F 7/04* (2006.01)

(52) U.S. Cl. ........ 370/338; 370/328; 370/401; 370/465; 370/469; 713/168; 726/3

(58) Field of Classification Search ........................ None
See application file for complete search history.

(56) References Cited

U.S. PATENT DOCUMENTS

| 6,023,464 | A | * | 2/2000 | Woundy | 370/352 |
| 6,115,376 | A | * | 9/2000 | Sherer et al. | 370/389 |
| 6,826,160 | B1 | * | 11/2004 | Wang et al. | 370/329 |
| 6,842,463 | B1 | * | 1/2005 | Drwiega et al. | 370/468 |
| 7,039,021 | B1 | * | 5/2006 | Kokudo | 370/310 |

(Continued)

FOREIGN PATENT DOCUMENTS
WO WO-00/76249 A1 12/2000
(Continued)

OTHER PUBLICATIONS

Business Editors/ High-Tech Writers: "WLAN Security Enhancements Critical to the Technology's Growth According to In-Stat" Business Wire, Jun. 13, 2001, p. 0071.*

(Continued)

*Primary Examiner* — Kwang B Yao
*Assistant Examiner* — Jutai Kao
(74) *Attorney, Agent, or Firm* — Harrington & Smith

(57) ABSTRACT

A method and device for routing data packets of a wireless terminal device in a communication network. When Open system Authentication is used, the system operates similarly as the current Nokia Operator Wireless LAN system, in which the terminal device and the access controller are the parties involved in the authentication. The access controller relays information relating to the authentication between the terminal device and an authenticating server, and it is capable of updating independently the list of users it maintains. When authentication according IEEE 802.1X authentication, the access point operates according to the IEEE 802.1X standard, serving as the authenticating party and relaying information relating to the authentication between the terminal device and the authentication server. In addition, the list maintained by the access controller is updated after a successful authentication, for example by the access point or the authenticating server.

37 Claims, 8 Drawing Sheets

U.S. PATENT DOCUMENTS

| | | | |
|---|---|---|---|
| 7,233,997 B1* | 6/2007 | Leveridge et al. | 709/229 |
| 7,512,081 B2* | 3/2009 | Ayyagari et al. | 370/255 |
| 2001/0001268 A1 | 5/2001 | Menon et al. | 370/329 |
| 2001/0016909 A1* | 8/2001 | Gehrmann | 713/171 |
| 2002/0009199 A1* | 1/2002 | Ala-Laurila et al. | 380/247 |
| 2002/0174335 A1* | 11/2002 | Zhang et al. | 713/168 |
| 2002/0191562 A1* | 12/2002 | Kumaki et al. | 370/331 |
| 2005/0002405 A1* | 1/2005 | Gao | 370/401 |
| 2005/0265503 A1* | 12/2005 | Rofheart et al. | 375/354 |
| 2007/0180244 A1* | 8/2007 | Halasz et al. | 713/168 |
| 2008/0134288 A1* | 6/2008 | Halasz et al. | 726/2 |

FOREIGN PATENT DOCUMENTS

| | | |
|---|---|---|
| WO | WO-01/41470 A2 | 6/2001 |

OTHER PUBLICATIONS

IEEE Std. 802.1X-2001, "Port-Based Network Access Control", Oct. 25, 2001, XP-002318322, pp. 21-56.

IEEE Std. 802.11-1997, "Part 11" Wireless LAN Medium Access Control (MAC) and Physical Layer (PHY) Specifications, Jun. 26, 1997, XP-002253605, pp. 60-70, 123.

* cited by examiner

METHOD AND APPARATUS FOR AUTHENTICATION IN A WIRELESS TELECOMMUNICATIONS SYSTEM

The present application claims priority to European Patent Application No. 02250352.8, filed on Jan. 18, 2002, and entitled "Method and Apparatus for Access Control of a Wireless Terminal Device in a Communications Network". That application is assigned to the assignee of the present invention and is incorporated by reference in its entirety.

The present invention relates to a method and apparatus for access control of a wireless terminal device to a communications network and particularly, although not necessarily, for relaying data packets of a wireless terminal device having controlled access to a wireless local area network.

PRIOR ART

A wireless local area network typically comprises a network comprising terminal devices, such as wireless terminal devices or portable computers and access points, wherein data transmission between the terminal devices and the access points is carried out partly or entirely in a wireless manner using radio waves or infrared technology.

The structure of telecommunications networks is generally described using the OSI model (Open System Interconnection), which defines the interfaces through which the different devices and the related software communicate with each other. The OSI model is based on a concept of layers, the lowest, or first, layer being known as a Physical Layer encompassing all logical, electrical and mechanical issues relating to data transfer. The second protocol layer, i.e. the Data Link Layer, is responsible for connection set-up, error correction and connection release. The third protocol layer, i.e. the Network Layer, provides data transfer not dependent on the network structure. The subsequent layers are the Transport Layer (fourth layer), Session Layer (fifth layer), Presentation Layer (sixth layer), and Application Layer (seventh layer).

In the OWLAN (Operator Wireless Local Area Network) system, authentication and access control currently take place on the third layer of the OSI model, i.e. the network layer, or IP layer, and WLAN-association between the terminal device and the Access Point is carried out without authentication. An access point is a physical device, such as a base station, interconnecting a wireless network and a wired one. In Open System Authentication the association event does not involve actual authentication, but the open system authentication, performed before association, is null authentication. After the association, the terminal device is typically provided with an IP address after the association event by means of an IP-based DHCP (Dynamic Host Configuration Protocol) method. Authentication is then carried out by executing an IP-based authentication protocol. Although the authentication protocol also employs protocol layers above the IP layer, the authentication is in this case referred to as authentication of the third protocol layer because access control is typically implemented on the third protocol layer. The Operator Wireless LAN solution includes the Network Access Authentication Protocol (NAAP), which is a protocol of the third protocol layer to authenticate the wireless terminal using the GSM Subscriber Identity Module. Another example of a third protocol layer authentication protocol are solutions based on the Hypertext Transfer Protocol (HTTP), where the authentication is performed using a World Wide Web (WWW) page in which the user fills in the credentials. Yet another example of a third protocol layer authentication protocol is the Internet Key Exchange (IKE) Protocol, which is used when setting up a Virtual Private Network connection. In all these examples, the wireless terminal needs to perform the third protocol layer authentication protocol before it can access the resources for which access control is being enforced.

Standardization provides a framework for hardware and software manufacturers to enable products of different manufacturers to be used side by side. The title of the WLAN standard is IEEE 802.11 and it has gradually been supplemented by a number of sub-standards. According to the forthcoming IEEE 802.11i standard, WLAN authentication will be carried out according to a second protocol layer authentication method, such as an IEEE802.1x protocol before transmission of IP packets between the terminal device and the network.

The first router in the OWLAN system, i.e. the edge router, which is between the communications network and the wireless terminals connected to the wireless local area network, functions in the OWLAN as the other party in the authentication carried out according to the third protocol layer, i.e. open system authentication and it maintains an Access Control List (ACL) of authenticated terminal devices. The IEEE is standardizing a new WLAN authentication system where authentication is performed against the Access Point. If the access network deploys only the new WLAN authentication system then the present OWLAN system, such as Nokia Operator Wireless LAN Release 1.0 solution cannot be used, because the client is not allowed to run the authentication protocol of the third protocol layer without first authenticating according to IEEE 802.1x protocol. As some users will acquire new terminal devices while others will have old terminal devices, there will be "old" terminals that can access to the network by using the third protocol layer authentication method and further there will be "new" terminals that can access to the network by using the authentication method according to IEEE 802.1x standard. Also there will be networks comprising access points that operate only according to IEEE 802.1x standard and other access points that operate as part of an OWLAN system. A problem that will be faced with in the standardization of current systems is the incompatibility of the present open system and the future second protocol layer authentication systems, i.e. the present terminals cannot access to networks according to the IEEE 802.1x standard and the future terminals according to the IEEE802.1x standard cannot access to the present open system networks.

SUMMARY OF THE INVENTION

A method and apparatus has now been invented for allowing a wireless terminal to access to a network by using either a third protocol layer authentication, such as open system authentication or second protocol layer authentication, such as according to the IEEE 802.1x protocol. An Access Point of the invention enables both Open System Authentication, in which the terminal device is authenticated at a later stage according to the third protocol layer, and authentication of the second protocol layer, such as IEEE 802.1x authentication. By using the invention certain network elements of the Wireless LAN solution can support both the new IEEE 802.1x layer 2 authentication standard and the current layer 3 authentication in a backward compatible way.

In the current Nokia Operator Wireless LAN solution, the access controller is responsible for maintaining an access control list and for performing a third protocol layer authentication protocol. In the present invention, these functionalities are separated into a logical access controller functionality and an authentication agent functionality for performing a third protocol layer authentication protocol. The network is organised so that at least part of the packets of terminal devices traverse the network element that contains the logical access controller functionality. The authentication agent functionality refers to the third protocol layer authentication protocol implementation, such as the NAAP protocol, the HTTP (Hypertext Transfer Protocol) authentication protocol or Internet Key Exhange (IKE) protocol implementation. The access controller functionality and the authentication agent functionality are not necessarily implemented in the same physical network element, but it is possible to implement the access controller functionality in the access point device or some other device instead.

If third protocol layer authentication is used, then the authentication agent operates as the authenticator entity performing the third protocol layer authentication protocol, as in the current Nokia Operator Wireless LAN solution. A successful authentication results in the terminal being added to an access control list. If the access controller functionality resides in a device separate from the authentication agent, then the authentication agent sends the terminal's information to the network element containing the access controller functionality. An authenticator is an entity that facilitates the network access authentication of the terminal device by operating as the peer entity in the authentication protocol used between the terminal and the authenticator. An authentication server is an entity that provides an authentication service to an authenticator. This service determines, from the credentials provided by the supplicant i.e. the terminal device, whether the supplicant is authorized to access the services provided by the authenticator. If second protocol layer authentication is performed, then the Access Point will first operate as specified in the IEEE standards and operate as the Authenticator entity. In addition, after successful authentication, the Access Point updates the access control list so that the packets of the clients authenticated at the second protocol layer are relayed too. If the access controller functionality resides in a device separate from the access point, then the access point sends the terminal's information to the network element containing the access controller functionality.

The invention provides a solution that allows a wireless local area network system, such as the Nokia Operator Wireless LAN, to support both an authentication standard of the second protocol layer, i.e. Layer 2, such as an authentication standard according to the IEEE 802.1x, and the current authentication standard based on the third protocol layer, i.e. Layer 3.

When Open System Authentication is used, the system operates similarly as the current Nokia Operator Wireless LAN system, in which the terminal device and the authentication agent are the parties involved in the authentication. The authentication agent relays information relating to the authentication between the terminal device and an authenticating server, and it is capable of updating the list of authenticated users, regardless of which network element maintains the list.

When authentication according to the second protocol layer is to be carried out, such as IEEE 802.1x authentication, the access point operates according to the IEEE 802.1x standard, serving as the authenticating party and relaying information relating to the authentication between the terminal device and the authentication server. In addition, the access control list is updated after a successful authentication, for example by the access point or the authenticating server, to allow the network element that contains the access controller functionality to also relay packets of terminals authenticated according to the second protocol layer.

As regards terminals employing the second protocol layer authentication, in the implementation according to the invention the interface provided between the terminal and the network is in full accordance with the standard. The invention does not set any new requirements on terminals employing the third protocol layer authentication either.

The advantages of the invention include compatibility with the current open system, where authentication is carried out on the third protocol layer, and with a system where authentication is carried out on the second protocol layer, for example according to the IEEE 802.1x standard. Regardless of the authentication method, the network element that contains the access controller functionality is capable of carrying out the bookkeeping and accounting routines relating to the transfer of data packets. Further the devices according to the new standard are able to operate in a network according to the present open system standard.

According to a first aspect of the invention a method is provided for access control of a wireless terminal device in a communication network, the network comprising an access point for setting up a communication connection to the terminal device, an authentication agent for relaying authentication information between the terminal device and an authentication server, a logical access controller functionality for relaying data packets of the authenticated terminal device and blocking data packets of unauthenticated terminal devices, the logical access controller functionality further comprising a list of authenticated terminal devices, an authenticating server for providing an authenticating service for the terminal device to authenticate to the network, the terminal device being configured to use one of the following authentication methods in order to authenticate itself to the network: a first authentication method wherein the access point relays authentication information between the terminal device and the authentication server, a second authentication method wherein the authentication agent relays authentication information between the terminal device and the authentication server, characterized by the method comprising the steps of identifying at the access point whether the terminal is using the first or the second authentication method, whereby if the terminal authenticates by using the first authentication method, performing the steps of: the access point relaying authentication information between the terminal device and the authentication server, the access point sending the identifier data of the terminal device, in response to successful authentication, to the list of the access controller functionality, the access controller functionality adding the identifier data of the authenticated terminal device to the list and relaying data packets of the terminal device included on the list, and if the terminal device authenticates by using the second authentication method, performing the steps of: the access point relaying information between the terminal device and the authenticating agent, the authentication agent relaying authentication information between the terminal device and the authentication server, the authentication agent sending identifier data of the terminal device, in response to successful authentication, to the list of the access controller functionality and the access controller functionality adding the identifier data of the authenticated terminal device to the list and relaying data packets of the terminal device included on the list.

According to a second aspect of the invention an access point is provided for setting up a communication connection to a terminal device in a network, said network further comprising an authentication agent for relaying authentication information between the access point and an authentication server, a logical access controller functionality for relaying data packets of the authenticated terminals included on a list and blocking data packets of unauthenticated terminals, an authenticating server for providing an authenticating service for the terminal device to authenticate to the network, the terminal device being configured to use one of the following authentication methods in order to authenticate itself to the network: a first authentication method wherein the access point is configured to relay authentication information between the terminal device and the authentication server, a second authentication method wherein the access point is configured to relay authentication information between the terminal device and an authentication agent, characterized in that the access point further comprises identifying means for identifying whether the terminal device is using the first or the second authentication method, first relaying means for relaying authentication information between the terminal device and the authentication server on the basis of the identified first authentication method, sending means for sending identifier data of the terminal device, in response to successful authentication of the first authentication method, to the list of the access controller functionality, second relaying means for relaying authentication information between the terminal device and the authentication agent and sending means for sending identifier data of the terminal device, in response to successful authentication of the second authentication method, to the list of the access controller functionality.

According to a third aspect of the invention a system is provided for relaying data packets of a wireless terminal device in a communication network, the network comprising: an access point for setting up a communication connection to the terminal device in a network, said network further comprising an authentication agent for relaying authentication information between the terminal device and an authentication server, a logical access controller functionality for relaying data packets of the authenticated terminal device and for blocking data packets of unauthenticated terminal devices, the access controller further comprising a list of authenticated terminal devices and relaying means for relaying data packets of the terminal devices included on the list, an authenticating server for providing an authenticating service for the terminal device to authenticate to the network, the terminal device being configured to use one of the following authentication methods in order to authenticate itself to the network: a first authentication method wherein the access point relays authentication information between the terminal device and the authentication server, a second authentication method wherein the access controller relays authentication information between the terminal device and the authentication server, characterized in that the system comprises identifying means for identifying at the access point whether the terminal device is using the first or the second authentication method, first relaying means for relaying at the access point the authentication information of the first authentication method between the terminal device and the authentication server, second relaying means for relaying information between the terminal device and the authentication agent, third relaying means at the authentication agent for relaying authentication information of the second authentication method between the access point and the authentication server, sending means for sending from the access point identifier data of the terminal device, in response to successful authentication of the first authentication method, to the list of the access controller functionality, sending means for sending from the authentication agent the identifier data of the terminal, in response to successful authentication of the second authentication method, to the list of the access controller functionality and relaying means for relaying data packets of the terminal device included on the list.

According to a fourth aspect of the invention a method is provided for relaying data packets of a wireless terminal device in a communication network, the network comprising; an access point for setting up a communication connection to the terminal device, an access controller for relaying authentication information between the terminal device and an authentication server, an authentication server for providing an authenticating service for the terminal device to authenticate to the network, the terminal device being configured to use one of the following authentication methods in order to authenticate itself to the network: a first authentication method wherein the access point relays authentication information between the terminal device and the authentication server, a second authentication method wherein the access controller relays authentication information between the terminal device and the authentication server, the method comprising; establishing a communication connection between the terminal device and the access point, characterized by the method further comprising the steps of identifying at the access point a parameter relating to the step of establishing a communication connection, classifying the terminal device on the basis of the identified parameter and directing data packets of terminal devices of different classes to separate logical channels on the basis of the classifying.

According to a fifth aspect of the invention an access point is provided for setting up a communication connection to the terminal device in a network, said network comprising: an access controller for relaying authentication information between the terminal device and an authentication server, an authentication server for providing an authenticating service for the terminal device to authenticate to the network, the terminal device being configured to use one of the following authentication methods in order to authenticate itself to the network: a first authentication method wherein the access point relays authentication information between the terminal and the authentication server, a second authentication method wherein the access point is configured to relay authentication information between the terminal device and the access controller, said access point comprising establishing means for establishing a communication connection between the terminal device and the access point, characterized in that the access point further comprises identifying means for identifying a parameter relating to the establishment of the communication connection, classifying means for classifying the terminal device on the basis of the identified parameter and directing means for directing data packets of terminal devices of different classes to separate logical channels on the basis of the classifying.

In the following, the invention will be described in greater detail with reference to the accompanying drawings, in which FIG. 1 is a flow diagram illustrating a method according to an embodiment of the invention;

Figure 1:
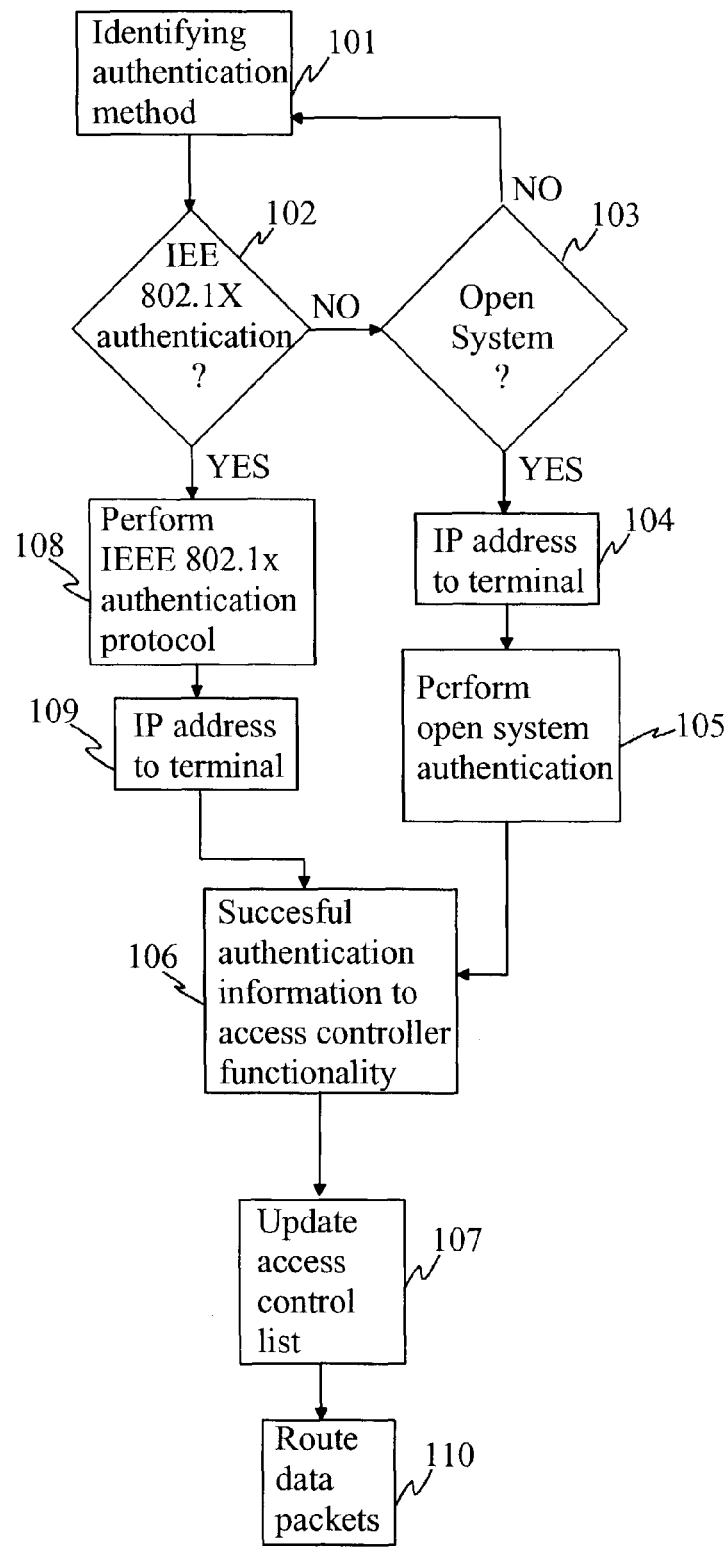

FIG. 1 shows a flow diagram of a method according to an embodiment of the invention. In step 101 an access point, and a terminal device, such as a wireless communications device, set up a connection and associate with each other. On the initiative of the access point, the routine then checks whether authentication according to the second protocol layer (step 102) or open system authentication according to the third protocol layer (step 103) is concerned. This check is performed at the access point based on authentication and association messages as will be explained in following. In a WLAN system according to the IEEE 802.11 standard, if the terminal is using open system authentication, it first sends the access point an authentication request message indicating open system authentication. The access point replies with an authentication response message. The exchange of these initial authentication messages does not actually authenticate the terminal but their function is null; hence the name open system authentication. Such open system authentication is also possible in WLAN systems according to IEEE 802.11i standard. In a WLAN system according to the IEEE 802.11i standard, if the terminal is using the 802.1x authentication method, there are no initial authentication request and response messages but the terminal first associates with the access point by sending an association request to the access point. The request comprises a request to authenticate by using the authentication method according to the IEEE 802.1x standard. Hence, the access point identifies the authentication method the terminal device is using based on the authentication and association messages. If the terminal employs the Open system Authentication method, the terminal receives an IP address from a DHCP server, for example, which may be located at the access point, authentication agent, or elsewhere in the network (104), after which an IP-based authentication protocol according to the third protocol layer is executed (105). An IP-layer authentication is carried out between a terminal device and an authentication agent. After a successful IP-layer authentication, the authenticated terminal is updated to an access control list maintained in the network element that includes the access controller functionality (step 106 and 107). This allows the access controller to relay data packets of the terminal device. If the access controller functionality resides in the authentication agent, then the authentication agent is capable of independently updating the access control list by internally sending the terminal's identifier data to the access controller functionality. If the access controller functionality resides in some other network element than the authentication agent, then the authentication agent may update the access control list by sending a message to the network element that contains the access controller functionality. For example, this message may be sent over the IP protocol using the User Datagram Protocol (UDP). The message includes at least the identifier data of the authenticated terminal, such as an IP address of the terminal, which is to be updated in the access control list.

If the terminal device is authenticated according to the second protocol layer, the IEEE 802.1x protocol (step 102), authentication is first carried out between the terminal device and the access point (step 108). After a successful authentication according to the IEEE 802.1x protocol, the terminal receives an IP address for example from the DHCP server, which may be located for example at the access point or at the authentication agent, or elsewhere in the network (step 109), and the access point transmits information about the event to the access controller functionality (step 106). If the access point contains the access controller functionality, then the access point independently updates the access control list by internally sending the terminal's information to the access controller functionality. If the access controller functionality resides in some other network element than the access point, then the access point updates the access control list by sending a message to the network element that contains the access controller functionality. For example, this message may be sent over the IP protocol using the User Datagram Protocol (UDP). The message includes at least the identifier data of the authenticated terminal, such as an IP address or a MAC address of the terminal, which is to be updated in the access control list. The access controller functionality adds then the information, such as the IP or the MAC address of the authenticated terminal device to the list it maintains (step 107). This allows the access controller functionality to relay data packets of the terminal (step 110).

Even if the access controller functionality is separate from the authenticator entity, such as the access point or the authentication agent, the authenticator entity does not necessarily need to send the access controller explicit information of a successful authentication if the access controller is able to conclude it otherwise, for example in the following manner. In connection with authentication, the authenticator entity typically communicates with the authentication server, which is further inside the network. The communication usually takes place using what is known as an AAA protocol (Authentication, Authorization, Accounting), such as the RADIUS (Remote Authentication Dial In User Service) or the DIAMETER protocol. If the access controller functionality functions as RADIUS proxy server and transmits AAA-protocol messages between the authenticator entity and the authentication server, the access controller functionality obtains information about a successful authentication already by examining the RADIUS messages. A problem that arises here in the case of IEEE 802.1x authentication is that the access controller needs the IP address of the terminal device, which is not yet known at the time the authentication succeeds, for the list it maintains. However, if the access controller functionality serves as the DHCP server distributing IP addresses after 802.1x authentication, the list can thus be updated by combining, at the access controller functionality, information about the successful authentication, the MAC address of the terminal thereby obtained, and the successful execution of the DHCP protocol, whereby an IP address corresponding to the MAC address is obtained.

Figure 2:
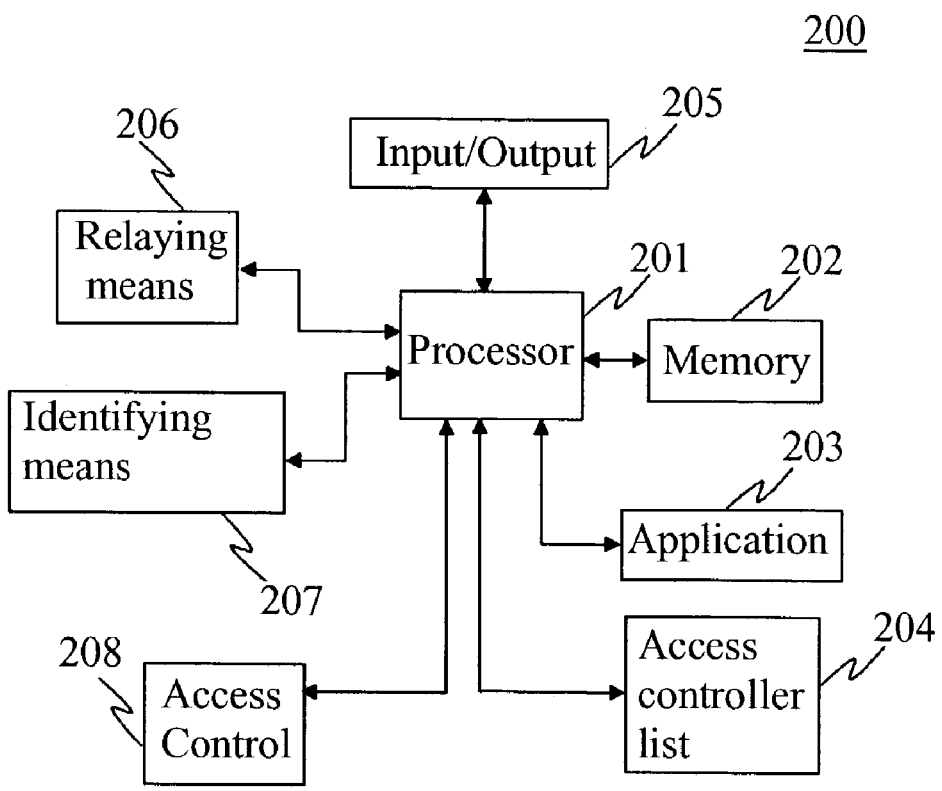
FIG. 2 shows a device according to an embodiment of the invention.

FIG. 2 shows an access point 200 of an embodiment of the invention. The access point 200 comprises a processor 201 and memory 202 for executing the operations in question and at least one application 203 for carrying out e.g. identifying of an authentication method. The access point 200 further comprises an interface 205 for connecting to the router, to servers, such as an access controller, or authentication server, for example. The access point further comprises identifying means 207 for identifying whether the terminal device is using the first or the second authentication method. Preferably the access point identifies the authentication method by receiving a message from the terminal, said message indicating the authentication method the terminal is using. If the terminal employs the open system authentication method, the message is preferably an authentication request message according to the IEEE 802.11 standard, said authentication request message indicates open system authentication. If the terminal employs the IEEE 802.1x authentication method, the message is an association request message preferably according to the IEEE 802.11i standard. Said association request message comprises an authentication suite element indicating IEEE 802.1x authentication. The access point further comprises sending means for sending the identifier data of the authenticated terminal to the list of the access controller if the terminal device is using the authentication method wherein the access point relays authentication information between the terminal and the authentication server. The access point further comprises relaying means 206 for relaying authentication information between the terminal device an one of the following: the authentication server if the terminal device is using the first authentication method, the authentication agent if the terminal device is using the second authentication method. In cases when the logical access control functionality is contained in the access point, the access point further comprises access control means 208 for relaying data packets of authenticated terminals and blocking data packets of unauthenticated terminals.

A terminal employing the open system authentication method receives an IP address for use from the DHCP server, which may be located at the authentication agent or, alternatively, at the access point or elsewhere in the network. The access point 200 relays authentication messages between the terminal and the authentication agent, which operates as the authenticator entity and authenticates the terminal device by using the IP-based authentication method of the third protocol layer. The authentication agent typically uses the authentication service provided by the authentication server by further relaying the authentication information between the terminal device and the authentication server, which verifies the authentication information. After the authentication, the authentication agent sends information about a successful authentication and the identifier data of the terminal, such as the terminal IP address or MAC address, to the access controller, which adds it to the access control list and starts to relay the data packets of the terminal.

When a terminal uses the IEEE 802.1x protocol for authentication, the access point operates as the authenticator entity and authenticates the terminal by using the IEEE 802.1x protocol of the second protocol layer. The access point typically uses the authentication service provided by the authentication server by relaying the authentication information between the terminal device and the authentication server, which verifies the authentication information. The access point sends information about a successful authentication and the identifier data of the terminal, such as the terminal IP address or MAC address, to the access controller, which adds the identifier data of the terminal to the access control list and starts to relay the data packets of the terminal.

Figure 3:
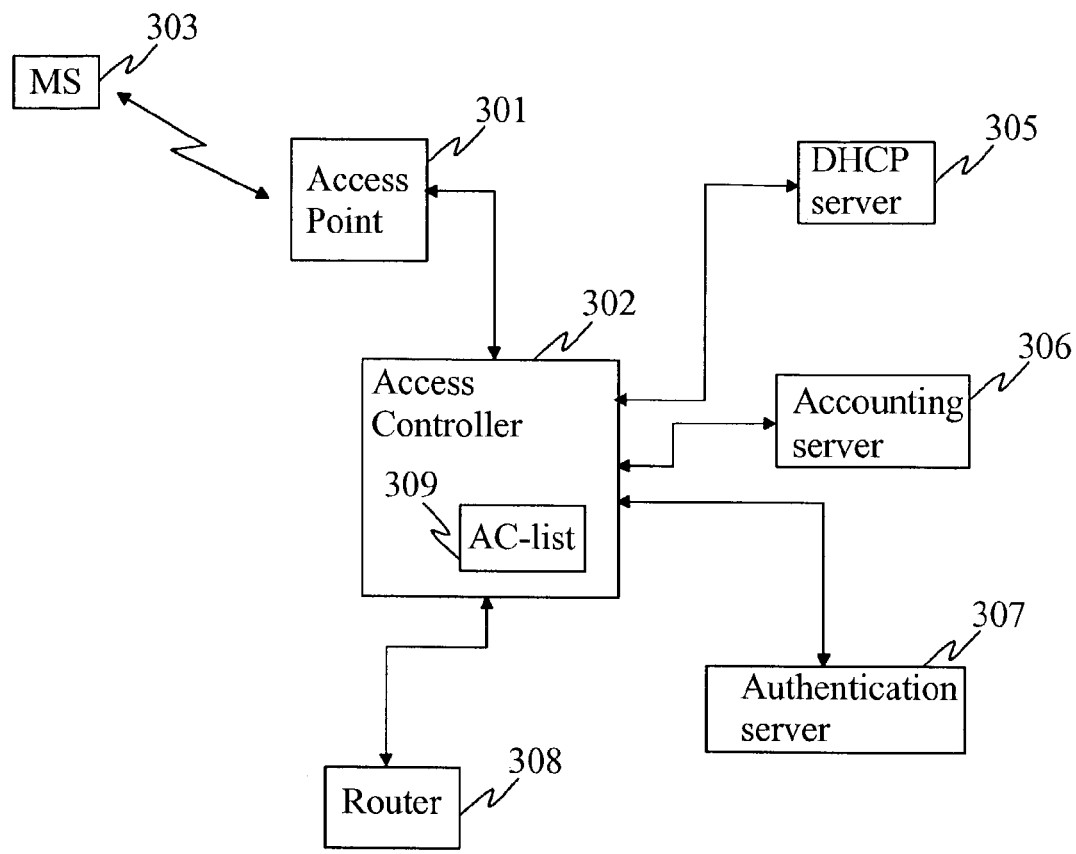
FIG. 3 shows the present Nokia Operator WLAN system.

FIG. 3 shows the present Nokia Operator WLAN system. The system comprises a wireless terminal device 303, such as a WLAN terminal, being configured to use the open system authentication in order to authenticate itself to the network, an access point 301, for providing a wireless connection from the communications device 303 to the network, an access controller 302 for relaying authentication information between the terminal device 303 and an authentication server 307, for maintaining an access controller list 309 of authenticated terminal devices (e.g. terminal device 303) and for relaying data packets of said authenticated terminal devices included on the list 309. The system further comprises the authentication server 307 for providing an authentication service to an authenticator, such as the access point 301 by determining whether the terminal device is authorized to access the services provided by the access point. The system may further comprise servers, such as a DHCP server 305 for providing an IP-address to the terminal device 302 when using the open system authentication, an accounting server 306 for accounting the amount of data transferred to and from the terminal device and a router for routing data packets of the terminal device.

When authentication of the wireless terminal device according to the third protocol layer, such as the open system authentication, is carried out, the terminal device 303 associates with the access point 301. Authentication is not carried out at this point yet. An IP address is formed for the terminal device 303 by means of the DHCP protocol, for example. Then follows the actual third protocol layer authentication. In an embodiment of the OWLAN system, for example, the communications device 303 broadcasts a paging message to page an authentication server 307, the message being answered by the authentication server 307. On the basis of the reply message, the terminal device 303 knows that the network in question requires IP-based, third protocol layer authentication between the terminal device 303 and the access controller 302. The access controller 302 exchanges authentication messages with the authentication server 307. In SIM authentication, for example, the International Mobile Subscriber Identity (IMSI) is transmitted to the authentication server 307. The access controller 302 communicates with the authentication server 306 by using an AAA protocol (Authentication, Authorization, Accounting), such as the RADIUS (Remote Authentication Dial In User Service) or the DIAMETER protocol.

The authentication server 307 obtains GSM challenges (GSM challenge is a parameter, i.e. 128 bit random number, used in a GSM authentication), and sends the challenges to the access controller 302, using the AAA protocol, which further relays them to the terminal device 303 using the third protocol layer authentication protocol NAAP. The terminal device 303 then calculates a response value corresponding to the issued challenge by using a secret key stored in the SIM card. The response value is a 32 bit number and the terminal device sends the response to the access controller 302, with the third protocol layer authentication protocol. The access controller 302 relays the information to the authentication server 307 with the AAA protocol. The authentication server 307 verifies the response by checking whether the terminal has calculated a correct response value or not. If the received response is correct, the authentication server 307 sends an indication of successful authentication to the access controller 302 with the AAA protocol, which relays the indication to the terminal 303 with the third protocol layer authentication protocol. After the authentication, the identifier data of the terminal device 303 is added to the access control list 309 by the access controller 302. The access controller 302 only transmits data packets of the communications device whose identifier data, such as an IP or MAC address, is found on the list 309.

Figure 4:
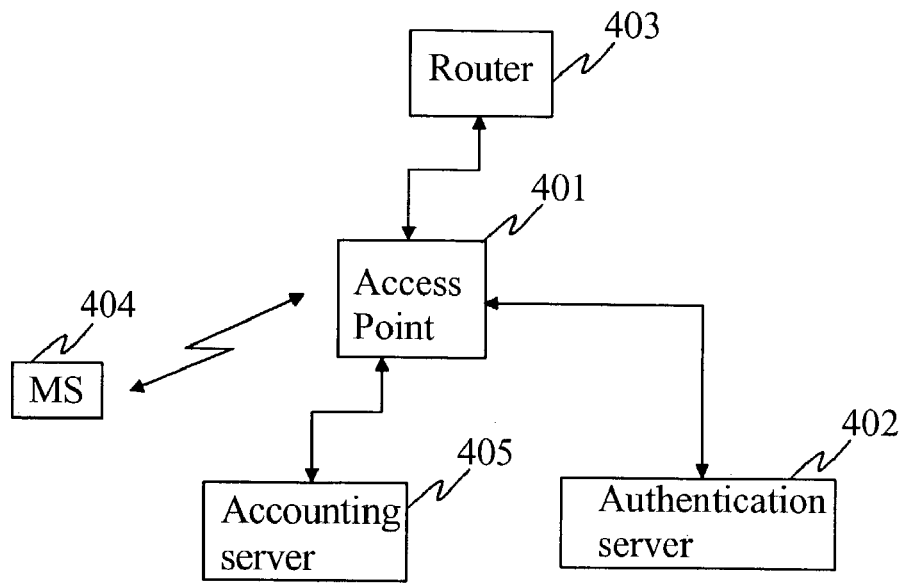
FIG. 4 shows a system according to the IEEE 802.1x protocol.

FIG. 4 shows a system according to the IEEE 802.1x protocol. The system comprises a wireless terminal device 404, such as a WLAN terminal, configured to use the authentication method according to IEEE 802.1x protocol in order to authenticate itself to the network, an access point 401 for setting up a communication connection to the terminal device 404 and for relaying authentication information between the terminal device 404 and an authentication server 402. The system further comprising the authentication server 402 for providing an authentication service to an authenticator, such as the access point 401 by determining whether the terminal device 404 is authorized to access the services provided by the access point 401 and an accounting server 405 for accounting the amount of data transferred to and from the terminal device. The system further comprising one or more routers 403 for routing data packets of the terminal device 404.

The authenticator entity, such as the access point 401, typically communicates with the authentication server 402 by using an AAA protocol (Authentication, Authorization, Accounting), similarly to the Nokia Operator Wireless LAN solution described above in FIG. 3. When the terminal is successfully authenticated the access point relays data packets between the terminal device 404 and the router 403.

Figure 5:
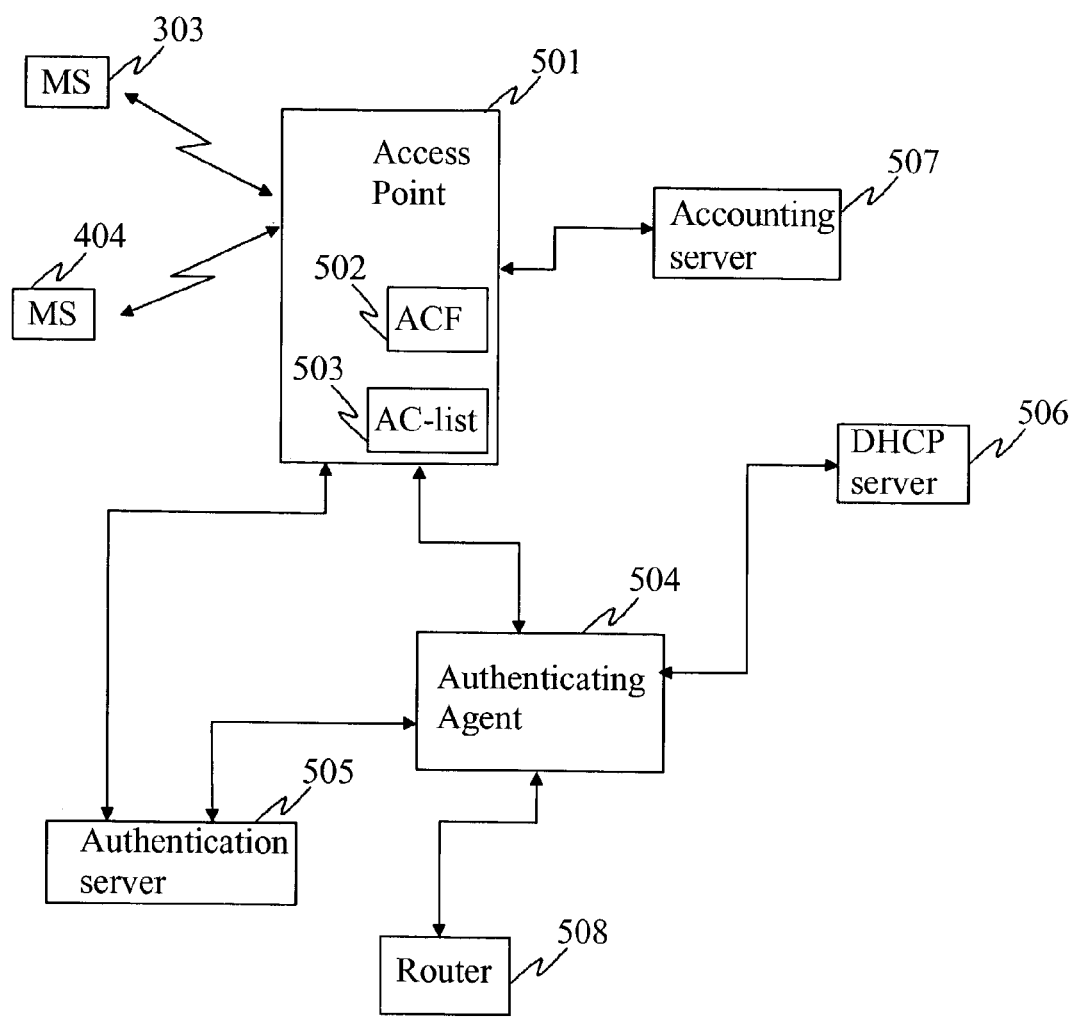
FIG. 5 shows a system according to an embodiment of the invention

FIG. 5 shows a system according to an embodiment of the invention. In the following the invention is exemplary illustrated in an environment that comprises a wireless terminal device 303, such as a WLAN terminal, that can authenticate by using third protocol layer authentication method, such as open system authentication and a wireless terminal device 404, such as a WLAN terminal, that can authenticate by using the authentication method according to the IEEE 802.1x standard, such as a Wireless LAN terminal that uses the IEEE 802.11i standard. The terminals are capable of setting up a connection to a communications network, which comprises an access point 501, for providing a wireless connection from the communications device 303, 404 to the network and for relaying authentication information between the terminal device 404 and an authentication server 505. The access point comprises a logical access controller functionality 502 for relaying data packets of the authenticated terminal and blocking data packets of unauthenticated terminals, and a list 503 of authenticated terminal devices. The access controller functionality 502 and the list 503 may alternatively be located for example in an authenticating agent 504, router 508 or somewhere else in the network. The system further comprises an authentication agent 504 for relaying authentication information between the terminal device 303 and the authentication server 505. The system further comprises servers, such as a DHCP server 506 for providing an IP-address for the terminal device 303, an accounting server 507 for accounting the amount of data transferred to and from the terminal device, and an authentication server 505 for providing an authentication service to an authenticator. The authenticator is one of the following: the access point 501 and the authentication agent 504. The authentication server 505 determines whether the terminal device is authorized to access the services provided by the authenticator. The system also comprises one or more routers 508 for routing data packets of the terminal devices 303, 404.

The access point 501 sends messages, such as beacon messages according to IEEE 802.11i or IEEE 802.11 standard, to the surrounding of the access point. Said beacon message may comprise authentication suite element that further comprises information of the authentication method the access point can handle, e.g. the authentication method according to the IEEE 802.11i standard. A wireless terminal 404 that implements the IEEE 802.11i standard will recognise that the access point supports the IEEE 802.1x authentication protocol. A wireless terminal 303 that does not implement the IEEE 802.11i standard does not process the authentication suite element, but it interprets the beacon message according to the IEEE 802.11 standard and hereby recognises that the access point 501 supports open system associations. The terminal 303, 404 receives the beacon message sent from the access point 501. The terminal device 303, 404 may get several beacon messages from several access points that are inside the range of the terminal. Alternatively to beacon messages, the terminal 303, 404 can also learn of local access points by sending messages, such as probe request message according to the IEEE 802.11i standard or the IEEE 802.11 standard, to all access points inside the range of the terminal. When the access point 501 receives the probe request message the terminal 303, 404 sends, in response to said probe request, a message, such as probe response message according to IEEE 802.11i or IEEE 802.11 standard. The probe response message to the terminal device 404 is sent according to the IEEE 802.11i standard and it comprises the authentication suite element that comprises information of the authentication method. The probe response message to the terminal device 303 may be sent according to the IEEE 802.11 standard and hence it does not need to include the authentication suite element. The terminal 303, 404 receives the probe response message from the access point 501. The terminal device 303, 404 may get several probe response messages from several access points that are inside the range of the terminal.

After discovering suitable local access points based on beacon messages or probe messages, the terminal device 303, 404 selects the access point that supports the authentication method the terminal is using. The terminal device 404 that supports the IEEE 802.11i standard and wishes to use the IEEE 802.1x authentication method adds the authentication suite element to the message, such as an association request message according to IEEE802.11i standard. The terminal device 303 that wishes to use open system authentication first starts the open authentication by sending an authentication request message, to which the access point 501 replies with an authentication response message indicating success. The open authentication is followed by association. The terminal device 303 does not include an authentication suite element in the association messages it sends. After that the terminal 303, 404 sends the association request message to the access point. On the basis of the authentication or association request message the access point 501 identifies the authentication method the terminal device 303, 404 is using.

When authentication of the wireless communication device according to the third protocol layer is carried out, the communications device 303 associates with the access point 501, authentication being not carried out at this point yet. An IP address is formed for the communications device 303 by means of the DHCP protocol, for example. Then follows the actual third protocol layer authentication. In an embodiment of the OWLAN system, for example, the terminal device 303 broadcasts a paging message to page an authentication agent 504, the message being answered by the authentication agent. On the basis of the reply message, the communications device 303 knows that the network in question requires IP-based, third protocol layer authentication between the communications device 303 and the authentication agent 504. The authentication agent 504 exchanges authentication messages with the authentication server 505 using an AAA protocol. The authentication procedure is similar to the Nokia Operator Wireless LAN system described in FIG. 3. The authentication agent 504 receives a notification of successful authentication from the authentication server 507 by means of the AAA protocol. After the authentication, the authentication agent sends the identifier data, such as an IP-address, of the terminal device 303, to the access controller functionality 502. In this embodiment, the access controller functionality 502 is implemented in the access point device 501. The authentication agent 504 sends a message to the access point 501. For example, the message can be formed using the User Datagram Protocol (UDP) over the Internet Protocol (IP). The message includes at least the identifier data of the terminal device 303. Upon receipt of the message, the access controller functionality 502 in the access point 501 adds the identifier data to the access control list 503. The access controller functionality 502 only relays data packets of the terminal device whose identifier data, such as an IP or MAC address, are found on the list 503. Authentication must typically be repeated after a specific period of time by the communications device, for example if the terminal device is switched off (due to low battery level), leaves the network (shadow region) or automatically discontinues the use of a service. The access controller 502 keeps a record of the duration of the connection of the communications device 303 and the number of data packets transmitted/received. The access controller 502 sends the information to the authentication server 505 or the accounting server 507, for example, to serve as a basis for user billing. Alternatively, authentication according to the third protocol layer can be carried out such that when the user activates a World Wide Web (WWW) browser, the authentication agent 504 sends to the browser of the terminal 303 a page inquiring about the user identification and the password, whereby the user is identified and added to the access control list 503. Yet alternatively, authentication according to the third protocol layer can be carried out using a Virtual Private Network (VPN) software, in which the user authentication is typically performed as part of the Internet Key Exchange (IKE) protocol.

In the second protocol layer authentication, the communications device 404 and the access point 501 agree already during the association that they will be using WLAN authentication (and not open system authentication as in the third protocol layer authentication). The WLAN authentication is carried out as specified in the IEEE 802.1x protocol. After a successful authentication, the access controller functionality 502 is informed of the event and it adds the terminal device 304 authenticated according to the second protocol layer to the access control list 503 and starts to relay the packets of the authenticated terminal device. Because the access controller functionality 502 is implemented in the access point device 501, the access point 501 is capable of locally sending the identifier data of the terminal to the access controller functionality 502. The access control list 503 comprises identifier data of terminals authenticated according to both the third and the second protocol layer. After the second protocol layer authentication, the authentication agent 504 does not need to subject the terminal device 404 to third protocol layer authentication any more, because the identifier data of the terminal device 404 are already in the list 503.

Figure 6:
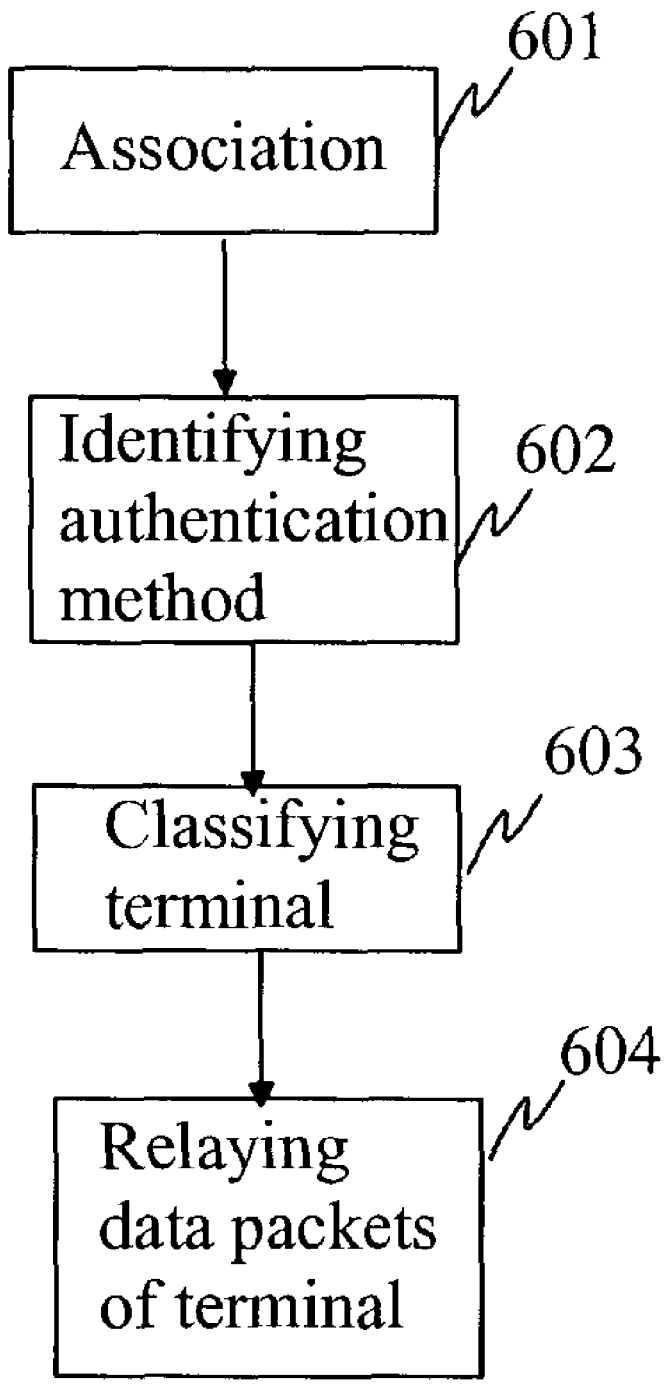
FIG. 6 shows a flow diagram of a method according to an alternative embodiment of the invention.

In an alternative embodiment of this invention, service differentiation is provided for different classes of terminal devices. FIG. 6 shows a flow diagram of a method according to the alternative embodiment of the invention. In step 601 an access point, and a terminal device, such as a wireless communications device, set up a connection and associate with each other. On the initiative of the access point (step 602), the routine then checks whether authentication according to the second protocol layer or open system authentication according to the third protocol layer is concerned. The terminal establishes communications with the access point by sending an authentication or an association request to the access point. The request comprises a request to authenticate by using the authentication method the device is using. In step 603 WLAN access point classifies WLAN clients to different classes preferably based on the authentication method used by the WLAN clients or based on some other parameters that are exchanged during association and authentication phase. In step 604 the access point relays data packets on the basis of the classification. The client class is taken into account when relaying data packets between the wireless network and the wired network (Distribution System, DS). For example, the authentication method, which is selected on association, may be used to classify users so that open system clients are directed to a different Virtual LAN (VLAN) than IEEE 802.1x/802.11i clients. In the 802.1x case, the access point may further differentiate clients based on the realm name portion of the user identity (Network Access Identifier, NAI). The realm name identifies the RADIUS server that authenticates the user. For example, a corporate WLAN access point may direct clients that are authenticated by the corporate RADIUS server to a different VLAN than clients that are authenticated by other RADIUS servers. For the sake of simplicity, the authentication method (open system or IEEE 802.1x) is used here as an example of the parameter by which the access point classifies wireless terminals into different classes. A person skilled in the art will find it apparent that the invention is not restricted to terminal classification by authentication method and that there are other parameters by which the access point may divide terminals into separate classes. The access point can use any parameter it learns upon communications establishment as a basis of classification. The parameter may be related to the radio technology, authentication or association or other areas of communication establishment, such as the radio frequency band, data rate used by the terminal, the Network Access Identifier or a part of it, or the Extensible Authentication Protocol (EAP) type used in IEEE 802.1x authentication.

Figure 7:
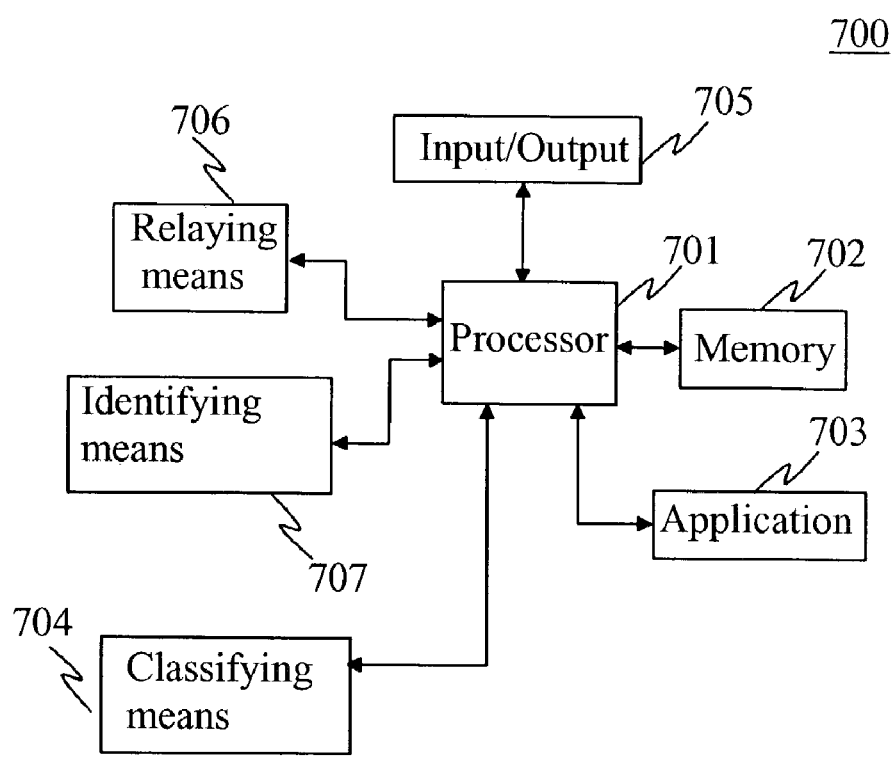
FIG. 7 shows an access point according to an alternative embodiment of the invention.

FIG. 7 shows an access point according to an alternative embodiment of the invention. The access point 700 comprises a processor 701 and memory 702 for executing the operations in question and at least one application 703 for carrying out e.g. identifying of an authentication method. The access point 700 further comprises an interface 705 for connecting to the router, to servers, such as an access controller, or authentication server, for example. The access point further comprises identifying means 707 for identifying, upon communication establishment, whether the terminal device is using the first or the second authentication method. Preferably the access point identifies the authentication method by receiving a message from the terminal, said message comprising the authentication method the terminal is using. If the terminal is using the first authentication method, the message is preferably association request message according to IEEE 802.11i standard, said association request message comprising an authentication suite element indicating IEEE 802.1x authentication. If the terminal is using the second authentication method, the message is preferably authentication request message according to IEEE 802.11 standard, said authentication request message indicating open system authentication. The device further comprises classifying means 704 for classifying terminals to different classes based on the identified authentication method. The access point further comprises relaying means 706 for relaying data packets of the wireless terminals between the wireless network and the wired network, said relaying means taking the client class into account by directing data packets of terminal devices of different classes to separate logical channels. The use of different Virtual LANs for different terminal classes is an example of how to take the terminal class into account when relaying data packets. Upon receipt of a data packet from a wireless terminal, the access point first detects the terminal class of the sending wireless terminal preferably based on the source MAC address field in the data packet and then relays the data packet to the wireless network using the Virtual LAN Identifier associated with the terminal class, so that packets from open system clients are relayed using a different Virtual LAN identifier than packets from 802.1x clients. Furthermore, upon receipt of a unicast data packet from the wired network, the access point first detects the terminal class of the destination wireless terminal, preferably based on the destination MAC address field in the data packet, and then verifies that the Virtual LAN Identifier in the data packet is correct, i.e. what it should be for the detected terminal class. The access point only relays the data packet to the destination wireless terminal if the packet was received from the wired network with the correct Virtual LAN Identifier. If the Virtual LAN identifier is incorrect, the access point preferably discards the data packet. Upon receipt of a multicast or broadcast data packet from the wired network, the access point cannot detect the terminal class of a single terminal device, because there may be several destinations. In this case, the access point may still process the data packets according to the terminal class indicated in the Virtual LAN identifier. For example multicast or broadcast data frames destined to open system clients may be transmitted without encryption or integrity protection, whereas IEEE 802.11i packet security may be applied to multicast or broadcast data frames destined to IEEE 802.1x clients.

Alternatively to Virtual LANs, the access point may differentiate the data packets based on IP subnetwork or IP address range. In this example, the access point ensures that the wireless terminal is assigned an IP address from the IP subnetwork or range that corresponds to the terminal class identified upon communications establishment. Preferably, the access point relays the DHCP packets sent by the wireless terminal on IP configuration phase to a suitable DHCP server based on terminal class, so that the terminal is assigned an address from the correct IP subnetwork or IP address range. Upon receipt of a data packet from a wireless terminal, the access point first detects the terminal class preferably based on the source MAC address field in the data packet and then verifies that the source IP address field (or another protocol field that comprises an IP address) in the received data packet belongs to the correct IP subnetwork or IP address range, associated with the detected terminal class. The access point only relays the data packet to the wired network if this verification succeeds. If this verification fails, the access point preferably discards the data packet. Further, upon receipt of a unicast data packet from the wired network, the access point first detects the terminal class preferably based on the destination MAC address field, and then verifies that the destination IP address field in the data packet belongs to the correct IP subnetwork or IP address range, associated with the detected terminal class. The access point only relays the data packet to the destination wireless terminal if this verification succeeds. If this verification fails, the access point preferably discards the data packet. Upon receipt of a multicast or broadcast data packet from the wired network, the access point still be able to detect a correct terminal class based on a protocol field comprising an IP address. Different processing, such as different encryption or integrity protection, may be applied to multicast or broadcast data packets destined to open system clients and IEEE 802.1x clients. For the sake of simplicity, use of separate Virtual LANs for different client classes is used as an example of how the access point takes the terminal class into account when relaying data packets between the wireless terminals and the wired network. A person skilled in the art will find it apparent that the invention is not restricted to the use of different Virtual LANs for each terminal class and that there are other ways of taking the terminal class into account in relaying data packets. Alternatively to Virtual LANs, the access point may take the terminal class into account by using any method of differentiating data packets into separate logical channels, based on terminal class, when relaying data packets between the wireless network and wired network. Another example of said method is packet tunnelling to different destinations based on terminal class. Upon receipt of a data packet from the wireless terminal, the access point detects the terminal class preferably based on the source MAC address field in the received packet. The access point then encapsulates the received packet within a new packet. The destination of the new packet is chosen based on the terminal class, so that different terminal classes are tunnelled to different destinations. The encapsulation is preferably IP encapsulation, wherein the original MAC header is removed, and the resulting IP packet is encapsulated within a new IP packet. The IP packet is then forwarded according to the new IP destination address. Correspondingly, the data packets received from the wired network may also be tunnelled. Upon receipt of a data packet from the wireless network, the access point detects the terminal class preferably based on the source IP address in the outer IP header, when different tunnel starting points are used for each terminal class. The access point then decapsulates the tunnelled packet and relays the resulting data packet to the destination wireless terminal.

Figure 8:
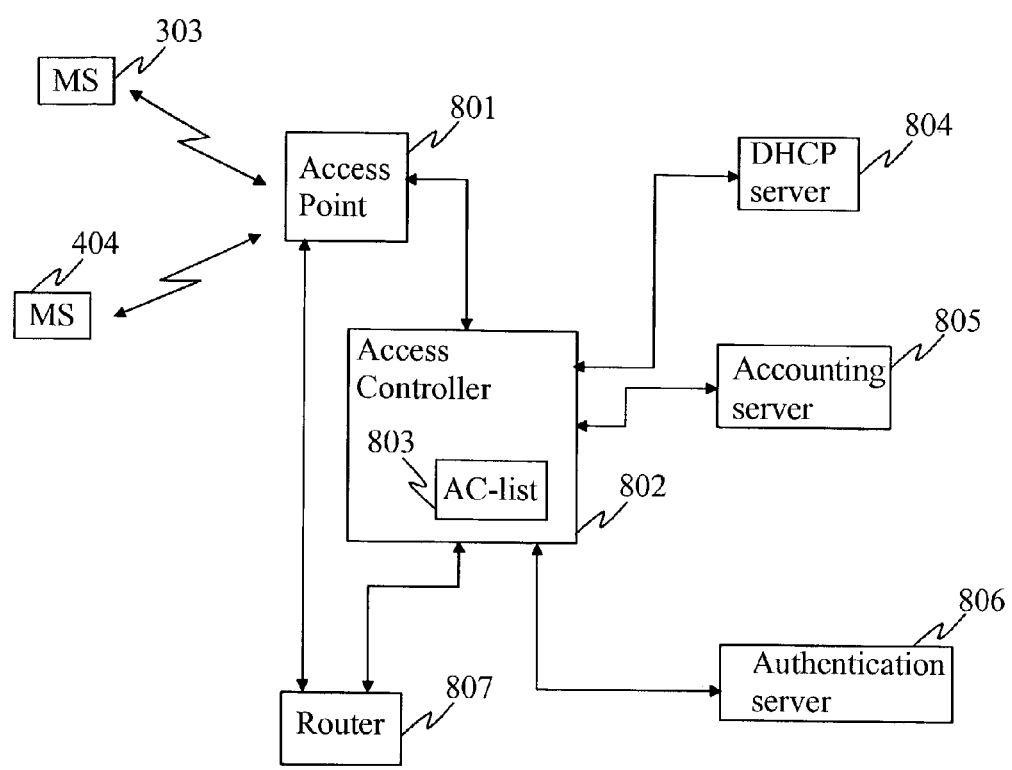
FIG. 8 shows a system according to an alternative embodiment of the invention.

FIG. 8 shows a system according to an alternative embodiment of the invention. In the following the invention is exemplary illustrated in an environment that comprises a terminal device 303 that can authenticate by using third protocol layer authentication method, such as open system authentication and a terminal 404 that can authenticate by using the authentication method according to the IEEE 802.1x standard, such as a Wireless LAN terminal that uses the IEEE 802.11i standard. The terminals are capable of setting up a connection to a communications network, which comprises an access point 801, for providing a wireless connection from the communications device 303, 304 to the network and for relaying authentication information between the terminal device 404 and an authentication server 806. The system further comprising access controller 802, that comprises a logical access controller functionality for relaying data packets of the open system authenticated terminal and blocking data packets of unauthenticated terminals, and a list 803 of authenticated open system terminal devices. The access controller 802 is relaying authentication information between the terminal device 303 and the authentication server 805. The system further comprises servers, such as a DHCP server 804 for providing an IP-address for the terminal device 303, accounting server 805 for accounting the amount of data transferred to and from the terminal device, and authentication server 806 for providing an authentication service to an authenticator, said authenticator being one of the following: the access point 801 and the access controller 802, by determining whether the terminal device is authorized to access the services provided by the authenticator, and one or more routers 807 for routing data packets of the terminal devices 303, 404.

This example system is arranged such that network access control for the open system terminal 303 is implemented in the access controller device 802, and network access control for the IEEE 802.1x terminal 404 is implemented in the access point device 801. The arrangement is based on data packet classification, in the access point device 801, into separate logical channels based on terminal authentication method.

When a terminal device 303 that uses the open system authentication method establishes communications with the access point, the access point 801 assigns the terminal 303 to a terminal class for which the access controller 802 employs access control at the third protocol layer. By use of Virtual LANs, the access controller 802 is configured to enforce access control to data packets received with a Virtual LAN Identifier assigned to open system terminals. If separate IP sub networks or IP address ranges are used to separate data packets into logical channels, the access controller 802 is configured to enforce access control to data packets of terminals 303 that use an IP address from the IP sub network or address range of open system terminals.

When a terminal device 404 establishes communications with the access point 801 and authenticates with the IEEE 802.1x authentication method, the access point 801 assigns the terminal 404 to a terminal class for which the access controller 802 does not employ access control. With Virtual LANs, it is possible to configure the access controller 802 to route data packets with the Virtual LAN identifier associated with the IEEE 802.1x terminal 404 without enforcing any access control. Alternatively, the Virtual LAN associated with the IEEE 802.1x terminals 404 may employ another router device 807 through which the data packets of IEEE 802.1x terminals 404 are routed, so that the data packets do not traverse the access controller 802. If separate IP sub networks or IP address ranges are used to separate data packets into logical channels, the access controller 802 may be configured to route data packets of terminals 404 that use an IP address from the IP subnetwork or address range of IEEE 802.1x terminals without enforcing access control.

The alternative embodiment of the invention according to FIGS. 6 to 8 makes it possible to use the same WLAN radio network for several purposes. The same radio network can serve legacy WLAN clients, such as OWLAN release 1 clients that use open system authentication, and new WLAN clients that use the new IEEE standards, such as OWLAN release 2 clients that use IEEE 802.1x authentication. An extreme access point implementation of this invention could look like two separate access points to the wireless clients. One of the "virtual" access points would allow open system associations and the other access point 802.1x associations. A simpler implementation would look like a single access point but it would support both open association and 802.1x association.

Another object for the alternative embodiment are protected networks that are currently built on Virtual Private Network (VPN) technology, such as corporate networks. An access point that implements this invention would be able to route open system clients to the existing LAN which is separated with a VPN gateway from the protected network. Open system clients will therefore need to establish a VPN connection in order to access the protected network. The access point could route IEEE 802.11i clients to a different Virtual LAN, which has direct connectivity to the protected network. Hence, this invention provides a managed deployment path from the current corporate WLAN solution to the new IEEE 802.11i solution.

In another example system employing the alternative embodiment of this invention, the terminal classification in the access point device can be used to direct data packets of terminal devices that use open system authentication to an uncontrolled network, on which no access control is enforced. Said uncontrolled network may be a local Intranet or other network with limited and free resources that are available to anyone. In this example, the data packets of terminal devices that use IEEE 802.1x authentication are directed to a controlled network, such as the global Internet. Said controlled network is such that it is only available to terminals that authenticate using the IEEE 802.1x authentication method.

Advantages of the alternative embodiment described above are: a single WLAN radio network is able to securely support both legacy and new WLAN clients, legacy and new WLAN clients may use different IP sub networks and different services, no support required in wireless stations.

The invention is not restricted to open system authentication and authentication according to IEEE802.11i protocol or the IEEE 802.1x protocol. The first embodiment of the invention can be used in any such system wherein a terminal can access to network by using an access point or authentication agent as an authenticator. The second embodiment of the invention can be used in any such system wherein it is advantageous to provide different service to different terminal classes, said terminal class identified based on a parameter of the communication establishment.

The above disclosure illustrates the implementation of the invention and its embodiments by means of examples. A person skilled in the art will find it apparent that the invention is not restricted to the details of the above-described embodiments and that there are also other ways of implementing the invention without deviating from the characteristics of the invention. The above embodiments should thus be considered as illustrative and not restrictive. Hence the possibilities of implementing and using the invention are only restricted by the accompanying claims and therefore the different alternative implementations of the invention, including equivalent implementations, defined in the claims also belong to the scope of the invention.

The invention claimed is:

1. A method comprising;
   establishing a communication connection between a wireless terminal device and an access point,
   identifying at the access point a parameter relating to an authentication method of the wireless terminal device, said authentication method being identified by receiving an association request message from the wireless terminal device,
   classifying the wireless terminal device on the basis of the identified parameter in the communication network, and
   directing data packets of the wireless terminal device to a logical channel selected on the basis of the classification of the wireless terminal device, different classifications being related to separate logical channels,
   the wireless terminal device being configured to use one of the following authentication methods in order to authenticate itself to a communication network: an 802.1x protocol authentication method wherein the access point relays authentication information directly between the terminal device and an authentication server, and an open system authentication method wherein the access point relays authentication information between the terminal device and the authentication server via an access controller, wherein the access point is configured to use both the 802.1x protocol authentication method and the open system authentication method.

2. A method according to claim 1, wherein the identified parameter is one of the following: Network Access Identifier, part of the Network Access Identifier used by the terminal device, frequency band, data rate, used radio technology of the terminal device.

3. A method according to claim 1, wherein the logical channel is one of the following: a Virtual LAN, an IP sub network, and an IP address range.

4. A method according to claim 3, wherein the access point ensures that the terminal device is assigned an IP address from the correct IP sub network or IP address range.

5. A method according to claim 1, wherein the logical channel comprises a tunnel.

6. A method according to claim 1, further comprising:
   verifying by the access point that the logical channel used for data packets matches the identified terminal device class.

7. A method according to claim 6, further comprising:
relaying by the access point only data packets for which said verifying is successful and discarding data packets for which said verifying is unsuccessful.

8. A method according to claim 1, wherein the access point is configured to apply different security processing to data packets of different terminal device classes.

9. An access point comprising:
establishing means configured to establish a communication connection between a wireless terminal device and an access point, wherein the access point is configured to accept from the wireless terminal device a request to use one of the following authentication methods in order to authenticate itself to a network: an 802.1x protocol authentication method wherein the access point is configured to relay authentication information directly between the wireless terminal device and an authentication server, an open system authentication method wherein the access point is configured to relay authentication information between the wireless terminal device and an authentication agent via the access controller, wherein the access point further comprises
identifying means configured to identify a parameter relating to the authentication method of the wireless terminal device, said authentication method being identified by receiving an association request message from the wireless terminal device,
classifying means configured to classify the wireless terminal device on the basis of the identified parameter in the communication network, and
directing means configured to detect data packets of the wireless terminal device to a logical channel selected on the basis of the classification of the wireless terminal device, different classifications being related to separate logical channels, wherein the access point is configured to authenticate using both the 802.1x protocol authentication method and the open system authentication method.

10. An access point according to claim 9, wherein said identifying means are arranged to identify the parameter in response to detecting one of the following: authentication method used by the terminal device, Network Access Identifier or part of the Network Access Identifier used by the terminal device, frequency band, data rate and used radio technology of the terminal device.

11. An access point according to claim 9, wherein said directing means are arranged to use one of the following as said logical channel: Virtual LANs, IP sub networks and IP address ranges.

12. An access point according to claim 9, further comprising verifying means configured to verify data packets that the logical channel used that match the identified terminal device class.

13. An access point according to claim 9, wherein the access point is arranged to only relay data packets for which said verification is successful and discards data packets for which said verification is unsuccessful.

14. A network comprising:
an authentication agent configured to relay authentication information between a wireless terminal device and an authentication server via an access point,
a logical access controller functionality configured to relay data packets of authenticated terminal devices included on a list and to block data packets of unauthenticated terminal devices,
the authentication server configured to provide an authenticating service for the wireless terminal device to authenticate to the network, wherein the access point is configured to accept the wireless terminal device to use one of the following authentication methods in order to authenticate itself to the network: an 802.1x protocol authentication method wherein the access point is configured to relay authentication information directly between the terminal device and the authentication server, and an open system authentication method wherein the access point is configured to relay authentication information between the terminal device and an authentication server via the authentication agent, the authentication server configured to utilize both the 802.1x protocol authentication method and the open system authentication method, in the network, the access point configured to set up a communication connection to the wireless terminal device, the access point comprising
identifying means configured to identify whether the terminal device is using the 802.1x or the open system authentication method and selecting the authentication method before starting the authentication, said authentication method being identified by receiving an association request message from the wireless terminal device,
first relaying means configured to relay authentication information between the terminal device and the authentication server if the terminal device was identified to be using the 802.1x authentication method,
first sending means configured to send identifier data of the terminal device, in response to successful authentication of the terminal device according to only the 802.1x authentication method, to the list of the access controller functionality,
second relaying means configured to relay authentication information between the terminal device and the authentication server via the authentication agent if the terminal device was identified to be using the open system authentication method and
second sending means configured to send identifier data of the terminal device, in response to successful authentication of the terminal device according to only the open system authentication method, to the list of the access controller functionality.

15. A network according to claim 14, wherein the identifying means are arranged to detect an authentication suite element from the association request message, said authentication suite element comprising the information of the authentication method the device is using.

16. A network according to claim 14 wherein the detecting means are arranged to detect successful authentication of the terminal device using said first authentication method by receiving a message from the authentication server.

17. A network according to claim 14, wherein the detecting means are arranged to detect successful authentication of the terminal device using said open system authentication method by receiving a message from one of the following: the authentication agent or the authentication server.

18. A network comprising:
an access point configured to set up a communication connection to a wireless terminal device,
an authentication agent configured to relay authentication information between the wireless terminal device and an authentication server,
a logical access controller functionality configured to relay data packets of the authenticated wireless terminal device and to block data packets of unauthenticated terminal devices, the logical access controller functionality further comprising a list of authenticated terminal devices, an authenticating server configured to provide an authenticating service for the wireless terminal device to authenticate to a communication network, the wireless terminal device being configured to use one of the following authentication methods in order to authenticate itself to the network: an 802.1x protocol authentication method wherein the access point relays authentication information directly between the wireless terminal device and the authentication server, an open system authentication method wherein the access point relays authentication information between the wireless terminal device and the authentication server via the authentication agent, in the communication network, a system for access control of the wireless terminal device, the authentication server configured to utilize both the 802.1x protocol authentication method and the open system authentication method, the network comprising:

identifying means configured to identify at the access point whether the wireless terminal device is using the 802.1x or the open system authentication method, said authentication method being identified by receiving an association request message from the wireless terminal device, first relaying means configured to relay at the access point the authentication information of the 802.1x authentication method between the wireless terminal device and the authentication server, second relaying means at the access point configured to relay information between the wireless terminal device and the authentication agent, third relaying means at the authentication agent configured to relay authentication information of the open system authentication method between the access point and the authentication server, first sending means configured to send from the access point identifier data of the terminal device, in response to successful authentication of the wireless terminal device according to only the 802.1x authentication method, to the list of the access controller functionality, second sending means configured to send from the authentication agent the identifier data of the wireless terminal device, in response to successful authentication of the terminal device according to only the open system authentication method, to the list of the access controller functionality and relaying means at the access controller functionality configured to relay data packets of the wireless terminal device included on the list.

19. A method comprising:

establishing a communication connection between a wireless terminal and an access point, identifying at the access point a parameter from an authentication request of the wireless terminal which authentication method from two possible authentication methods the wireless terminal supports before starting the authentication, wherein the two possible authentication methods comprise a layer 2 authentication method and a layer 3 authentication method, said layer 2 or layer 3 authentication method being identified by receiving an association request message from the wireless terminal, and authenticating the wireless terminal utilizing the identified authentication method, wherein in the layer 2 authentication method the access point relays authentication information directly to the wireless terminal, and in the layer 3 authentication method the access point relays authentication information to the wireless terminal via an access controller.

20. The method according to claim 19, wherein the layer 2 authentication method utilizes IEEE 802.1x protocol.

21. The method according to claim 20, wherein the layer 3 authentication method utilizes an open system authentication method.

22. An apparatus comprising:

a processor and a memory configured to:

establish a connection to a wireless terminal device;

identify a parameter from an authentication request of the wireless terminal, which parameter determines which authentication method of the two possible authentication methods the wireless terminal supports before starting the authentication, wherein the two possible authentication methods comprise a layer 2 authentication method where the apparatus relays authentication information directly to the wireless terminal and a layer 3 authentication method where the apparatus relays authentication information to the wireless terminal via an access controller, said layer 2 or layer 3 authentication method being identified by receiving an association request message from the wireless terminal device; and convey authentication information directly or indirectly to the wireless terminal using the authentication method determined by the parameter.

23. The apparatus according to claim 22, wherein the layer 2 authentication method is IEEE 802.1x protocol.

24. The apparatus according to claim 23, wherein the layer 3 authentication method is an open system authentication method.

25. The apparatus according to claim 24, wherein the apparatus is an access point of a wireless radio network.

26. An access point comprising:

a processor; and a memory, wherein the access point, in conjunction with the processor and the memory, is configured to set up a communication connection to a wireless terminal device in the communication network, the access point is configured to communicate with an authentication agent configured to relay authentication information of the wireless terminal device received from the access point to an authentication server, and a logical access controller functionality is configured to relay data packets of the authenticated terminal device and to block data packets of unauthenticated terminal devices, the logical access controller functionality further comprising a list of authenticated terminal devices, the authenticating server is configured to provide an authenticating service for the terminal device to authenticate to the network, the access point is configured to use either of the following authentication methods in order to authenticate the terminal device: an 802.1x protocol authentication method wherein the access point relays authentication information directly between the terminal device and the authentication server, and an open system authentication method wherein the access point relays authentication information between the wireless terminal device and the authentication server via the authentication agent, in the communication network, said 802.1x protocol or open system authentication method being identified by receiving an association request message from the wireless terminal device.

27. The access point as in claim 26, the access point configured to identify which of the 802.1x protocol and open system authentication methods the wireless terminal device is using,
- wherein if the wireless terminal device is identified to authenticate by using the 802.1x protocol authentication method but not the open system authentication method, the access point is configured to perform the following:
- relaying authentication information directly between the wireless terminal device and the authentication server, and
- sending the identifier data of the wireless terminal device, in response to successful authentication, to the list of the access controller functionality,
- wherein the access controller functionality is configured to add the identifier data of the authenticated wireless terminal device to the list and relay data packets of the wireless terminal device included on the list.

28. The access point as in claim 26, the access point configured to identify which of the 802.1x protocol and open system authentication methods the wireless terminal device is using,
- wherein if the wireless terminal device is identified to authenticate by using the open system authentication method, the access point is configured to perform the following:
- relaying authentication information between the wireless terminal device and the authenticating agent, and
- relaying authentication information between the access point and the authentication server,
- wherein the authentication agent is configured to send the identifier data of the wireless terminal device, in response to successful authentication, to the list of the access controller functionality, wherein the access controller functionality is configured to add the identifier data of the authenticated terminal device to the list and relaying data packets of the terminal device included on the list.

29. The access point as in claim 26, wherein the access controller functionality is implemented as part of an access point device.

30. The access point as in claim 26, wherein the access controller functionality is implemented as part of an authentication agent device.

31. The access point as in claim 26, wherein the access controller functionality is implemented in a device separate from the access point and the authentication agent.

32. The access point of claim 31, wherein the authentication agent is configured to update an access control list by sending a message to the device separate from the access point and the authentication agent.

33. The access point of claim 27, wherein the identifier data comprises at least one of the following: the IP address and the MAC address of the terminal device.

34. The access point of claim 28, wherein the identifier data comprises at least one of the following: the IP address and the MAC address of the terminal device.

35. The access point of claim 28, wherein the open system authentication method is performed according to one of the following: the internet key exchange protocol and the hypertext transfer protocol.

36. The access point of claim 26, the association request message comprising an authentication suite element, said authentication suite element further comprising the information of the authentication method the device is using.

37. The access point of claim 26, the access point further configured to renew the authentication after a time period.

* * * * *